United States Patent [19]

Tokuda et al.

[11] Patent Number: 4,483,492
[45] Date of Patent: Nov. 20, 1984

[54] AUTOMATIC WINDING DETECTION APPARATUS FOR A WEB

[75] Inventors: Kanji Tokuda; Kenji Nakauchi, both of Kaisei, Japan

[73] Assignee: Fuji Photo Film Co., Ltd., Ashigara, Japan

[21] Appl. No.: 459,038

[22] Filed: Jan. 17, 1983

[30] Foreign Application Priority Data

Feb. 15, 1982 [JP] Japan .................................. 57-22292

[51] Int. Cl.³ ........................ B65H 25/32; H02P 3/08
[52] U.S. Cl. .................................... 242/57; 242/75.51
[58] Field of Search ............... 242/57, 75, 75.51, 186; 318/474

[56] References Cited

U.S. PATENT DOCUMENTS

| | | | |
|---|---|---|---|
| 3,253,204 | 5/1966 | Hudson et al. | 318/474 |
| 3,283,236 | 11/1966 | Legg | 318/474 |
| 3,435,289 | 3/1969 | Aselman, Jr. | 318/474 |
| 4,241,299 | 12/1980 | Bertone | 318/474 |

*Primary Examiner*—Stuart S. Levy
*Assistant Examiner*—Lloyd D. Doigan
*Attorney, Agent, or Firm*—Wenderoth, Lind & Ponack

[57] ABSTRACT

When automatically winding a web of photographic paper or film fed from a feeding means such as a roller on a reel core, it is necessary to detect whether the web has been wound on the reel core or not in order to present jams and other inconveniences. The present invention achieves accurate detection of the web winding on the reel core by detecting a driving current of a motor which drives and revolves the reel core and comparing thus detected driving current with a reference value.

2 Claims, 5 Drawing Figures

AUTOMATIC WINDING DETECTION APPARATUS FOR A WEB

BACKGROUND OF THE INVENTION

This invention relates to an automatic winding detection method and apparatus to detect whether a web fed from a feeding means has securely been wound on a reel core.

When automatically winding a web of photographic paper or film which is fed from such feeding means as a roller on a reel core, if the feeding means keeps on supplying the web even though the web has not been securely wound on the reel core, the web might be damaged or wasted as it becomes jammed in the member. It is therefore necessary to detect after a predetermined period of time if the web has really been wound on the reel core and to generate, if necessary, an alarm signal. The feeding means continuously feeds the web until the time it is securely wound on the core but reduces the driving rate thereof or suspends the driving thereafter so as to make the web to be wound on by an intermittent drive. The detection above mentioned is also required for such a switching in driving.

FIGS. 1 and 2 schematically show constructions of prior art devices of checking such winding of the web. In the mechanism shown in FIG. 1, paper 1 fed by a feeding roller 2 is made to abut a winding detection roller 3, is directed to pass between a lower guide 4 and an upper guide 5, and then is wound on a reel core 6 which is revolved by a motor 7. At stationary time, the winding detection roller 3 does not rotate, but as the paper 1 is wound on the reel core 6, the tension caused thereby makes the roller 3 rotate. The rotation thus caused is measured by, for instance, a tachogenerator 8 to sense the rotation moment of the paper 1 on the reel core 6. By judging from the rotational moment caused when the paper is wound on the core 6, the situation of the paper winding can be detected. In the structure shown in FIG. 2, a flexible and curved protrusion 9 is provided on the lower guide 4. The downward tension caused by winding the paper 1 on the core 6 is detected by, for instance, a limit-switch 10 which is so provided as to be engaged with the protrusion 9.

Those conventional web winding detection mechanisms, however, are detrimental in that reel means additionally requires a tachogenerator, a limit-switch or other electric devices, thereby making the structure of the reel part more complicated. The reel part of the device is desirably contained in a magazine structure as a unit so that it may be taken out as soon as the winding ends and new empty reels can be inserted successively. For this purpose, the structure should be simplified sufficiently to allow the detection at the magazine mounting portion and be compact enough to be free of space-consuming electric devices.

SUMMARY OF THE INVENTION

Accordingly, an object of this invention is to provide a method and the apparatus therefor which enables detection by a simple electric circuit the winding of a web and which does not require electric devices such as a tachogenerator or a limit-switch.

Another object of this invention is to provide a web winding detection system which is simple in the structure for detecting the end of web winding operation and requires a smaller space.

Other aspect, objects, and the several advantages of the invention will become apparent to one skilled in the art from a reading of the following disclosure and the appended claims.

DETAILED DESCRIPTION OF THE INVENTION

This invention concerns a winding detection method and apparatus for a paper reel system wherein a web supplied from a feeding means is to be wound on a reel core. The method according to this invention comprises the steps of detecting the driving current of a motor which drives and rotates a reel core, comparing the detected current with a reference value and sensing the end of paper winding on the reel core. This invention further relates to an apparatus which detects the winding by using a voltage corresponding to the detected driving current as a comparison detection signal.

Figure 1:
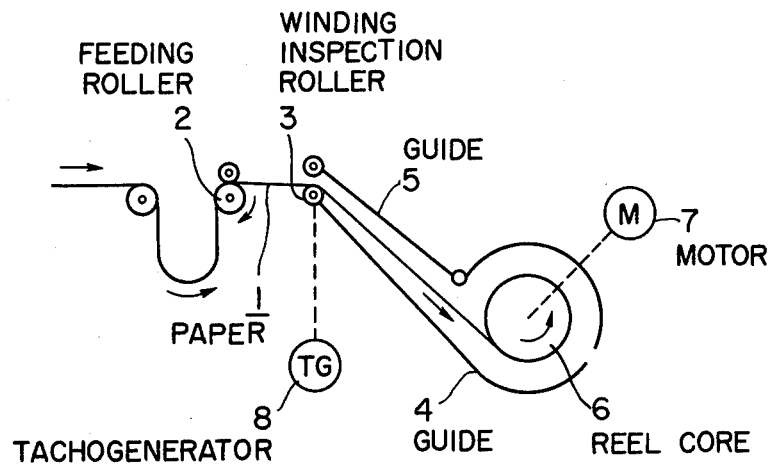
FIGS. 1 and 2 are structural views to show examples of prior art winding end detection devices.
Figure 2:
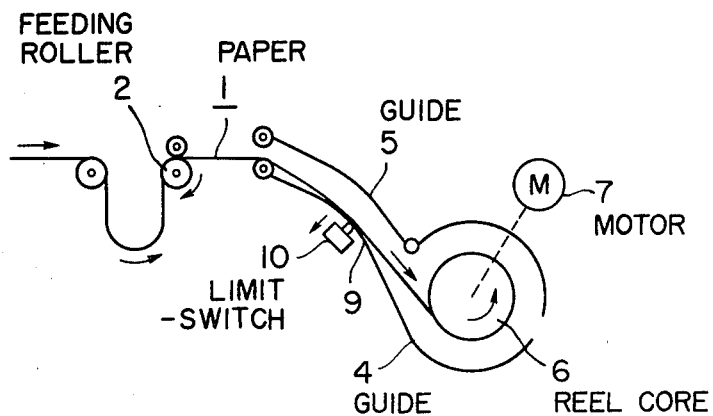
Figure 3:
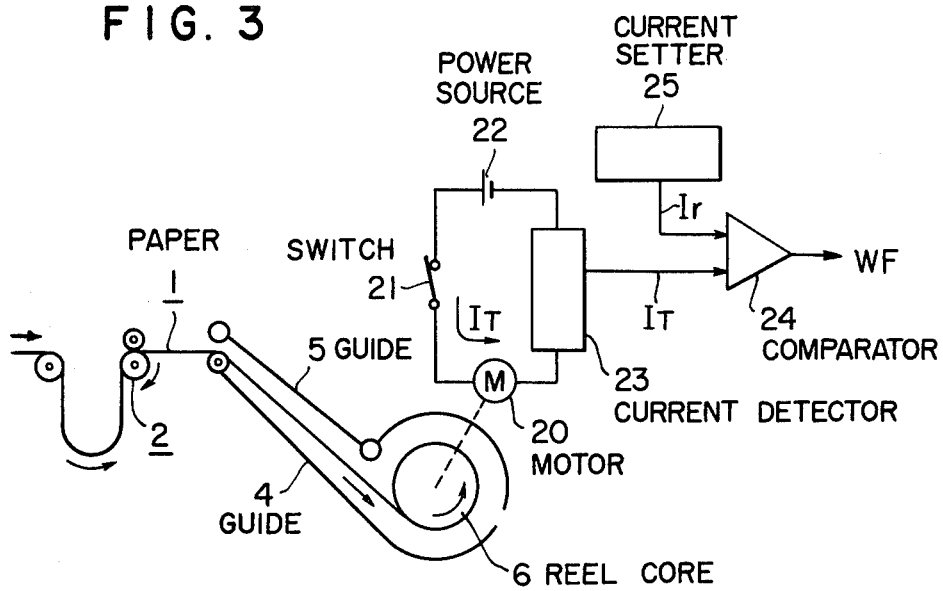
FIG. 3 is a structural view to illustrate an embodiment of the apparatus according to this invention.

FIG. 3 shows an embodiment according to this invention wherein a DC power source 22 is connected through a switch 21 to a DC motor 20 which drives and rotates the reel core 6, and a current detector 23 is interposed between the DC motor 20 and the DC power source 22 in order to detect driving current $I_T$. The driving current $I_T$ of the DC motor 20 detected by the current detector 23 is fed to a comparator 24 to be compared with the reference current value $I_r$ preset by a current setter 25 in advance. The comparator 24 outputs a winding finish signal WF when the driving current $I_T$ exceeds the reference current value $I_r$.

Figure 4:
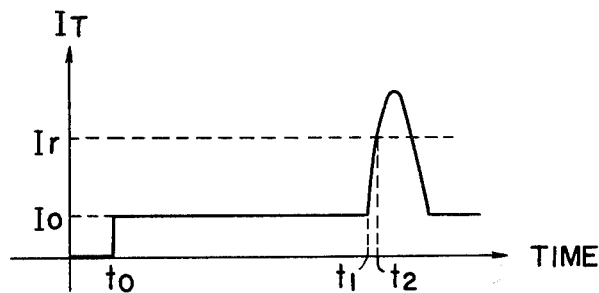
FIG. 4 is a time chart to show the changes in motor driving current.

The operation of the above-mentioned apparatus will now be explained referring to the time chart shown in FIG. 4. If the switch 21 is at OFF position, the motor 20 is not driven because of the driving current $I_T$ is equal to zero. If the switch 21 is turned ON, the motor 20 is driven to revolve (the time point $t_0$) and the paper 1 starts to be wound by the rotation of the reel core 6. The driving current $I_T$ of the motor 20 is the steady state current $I_D$ at the time. As the paper 1 has been wound almost to the end, the load torque imposed on the motor 20 by the tension of the paper increases and the driving current $I_T$ correspondingly increases (after the time point $t_1$). When the driving current $I_T$ exceeds the reference current value $I_r$ which was initially preset by a current setter 25 (at the time point $t_2$), the comparator 24 outputs a winding finish signal WF. It is therefore possible to detect whether the paper 1 has been wound on the reel core 6 or not simply by selecting an appropriate value as the reference current value $I_r$.

This invention achieves correct and stable detection of the time when the paper 1 has finished winding on the reel core 6 as well as a simple and compact structure therefor.

Figure 5:
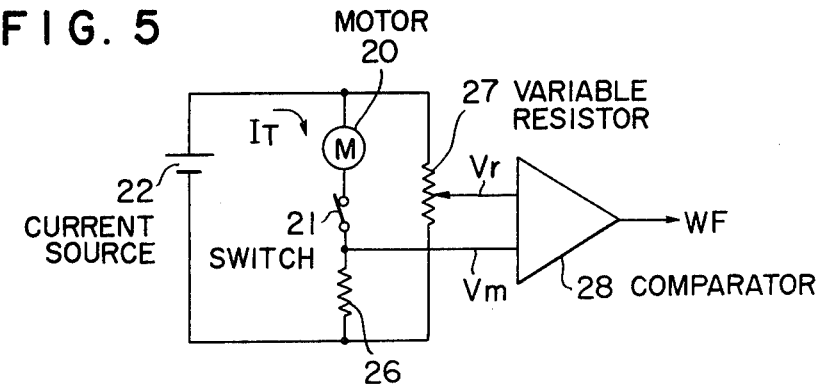
FIG. 5 is a structural view to show another embodiment of this invention.

Another embodiment according to the present invention illustrated in FIG. 5 comprises a DC motor 20 connected through a switch 21 to a DC current source 22 which drives and revolves the reel core 6, a resistor 26 as a voltage detection means to detect a voltage $V_m$ corresponding to the driving current $I_T$ of the motor 20 and a comparator 28 which compares the voltage $V_m$ detected by the resistor 26 with the reference voltage $V_r$ obtained by driving the DC power source 22 with a variable resistor 27 to sense whether the winding of the paper 1 on the reel core 6 has finished or not and is constructed in a manner that when a winding finish signal WF is outputted from the comparator 28, the winding operation of the paper 1 on the reel core 6 is suspended.

As the voltage $V_m$ corresponding to the driving current $I_T$ of the motor 20 is compared with the reference voltage $V_r$ which was initially formed by dividing the DC power source 22 so as to output a winding finish signal WF in this invention, even if the DC power source 22 fluctuates, the fluctuation will be readily and mutually compensated to assure the correct detection of the winding finish.

The present invention has been explained on an embodiment where the reel core is driven and rotated by a DC motor in the foregoing, the similar application can be possible on a AC motor.

What is claimed is:

1. An automatic web winding detection apparatus comprising:
   a motor which is connected to a power source and which drives and revolves a reel core of an automatic winding device for winding a web fed from a feeding means on said reel core;
   a voltage detection means comprising a resistor connected in series with said motor for detecting a voltage which corresponds to a driving current of said motor; and
   a comparator which compares said voltage detected by said voltage detection means with a reference voltage obtained by voltage dividing a voltage from said power source for said motor so as to thereby sense the end of the winding operation of the web on the reel core on the basis of said voltage comparison.

2. An automatic web winding detection apparatus as claimed in claim 3, wherein said reference voltage is output by a variable resistor connected to said power source.

* * * * *